UNITED STATES PATENT OFFICE.

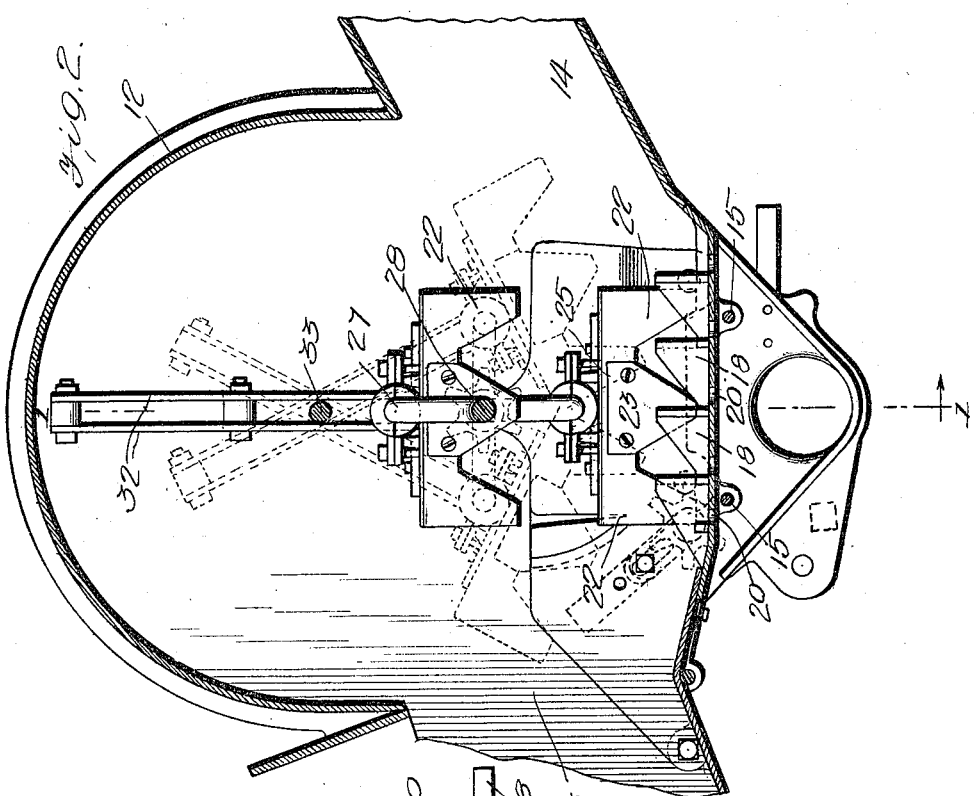
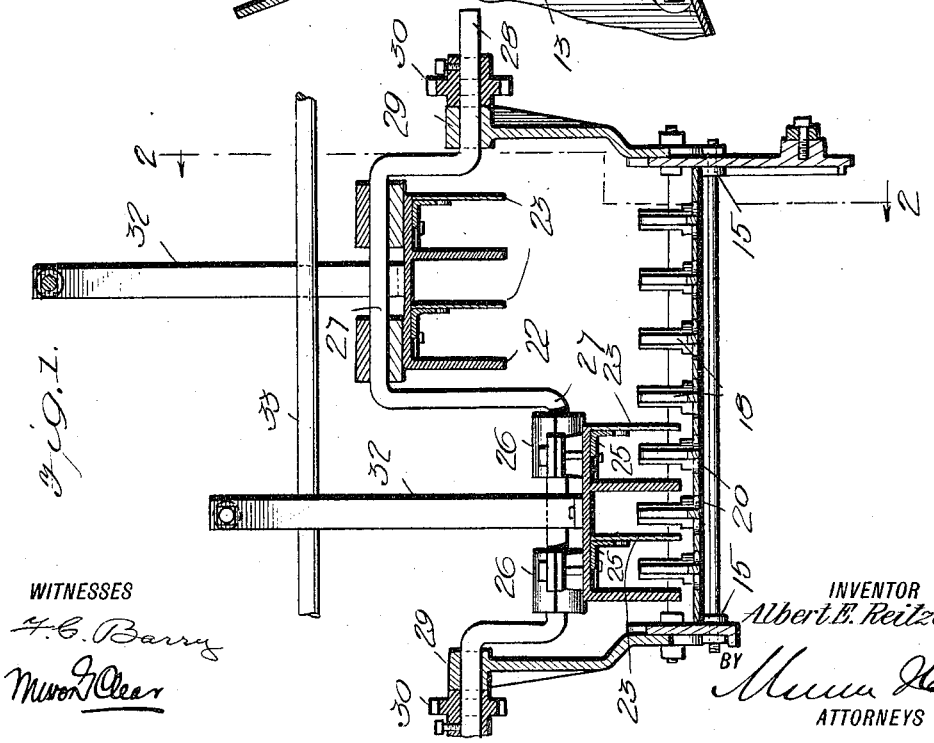

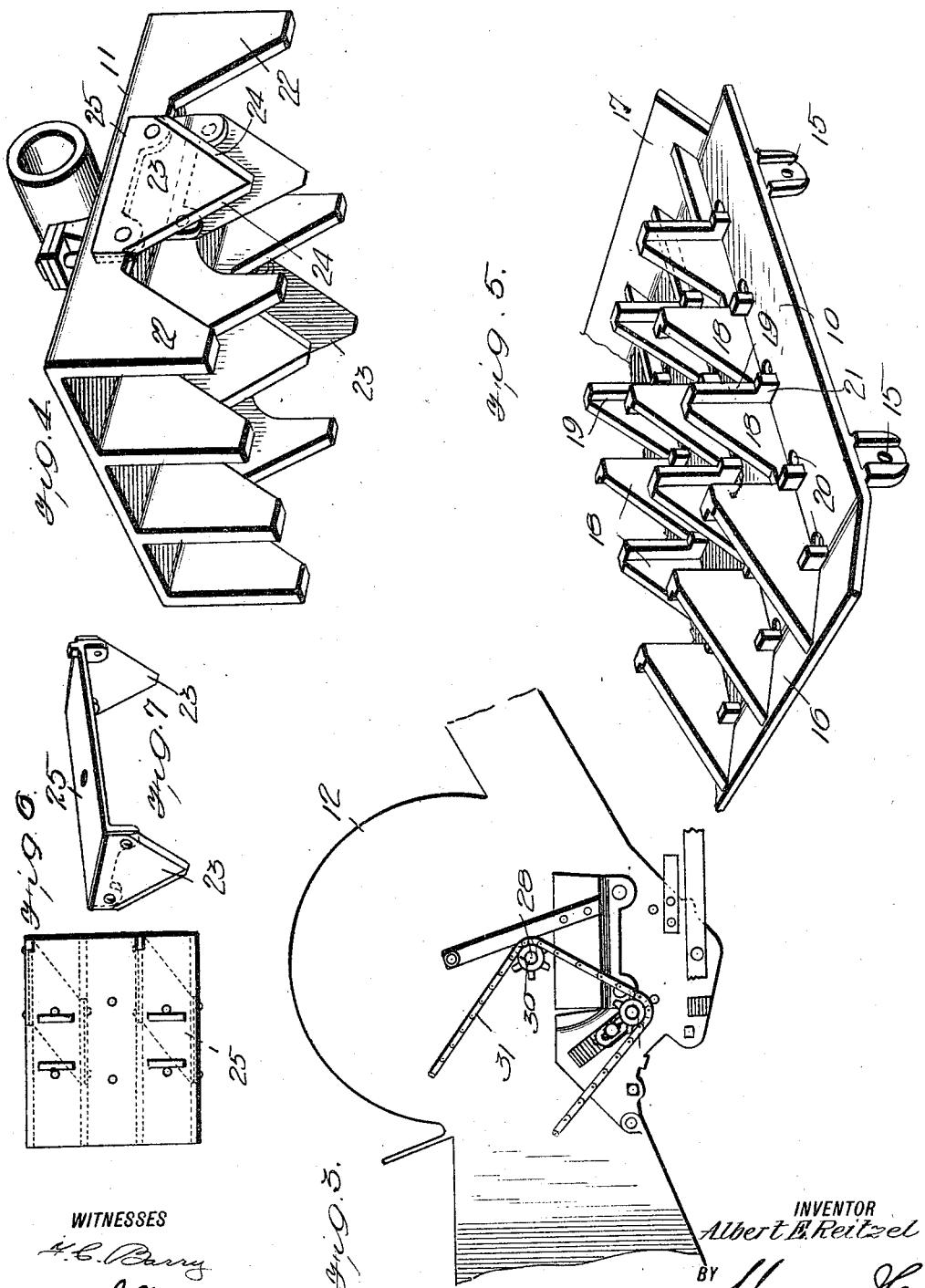

ALBERT E. REITZEL, OF WASHINGTON, DISTRICT OF COLUMBIA.

THRESHING APPARATUS.

1,306,028. Specification of Letters Patent. Patented June 10, 1919.

Application filed September 5, 1917. Serial No. 189,729.

*To all whom it may concern:*

Be it known that I, ALBERT E. REITZEL, a citizen of the United States, and a resident of Washington, in the District of Columbia, have invented a new and useful Improvement in Threshing Apparatus, of which the following is a specification.

My present invention relates generally to threshing apparatus, and more particularly to an apparatus of this character for threshing peas and beans, my object being the provision of a novel construction whereby to operate speedily and effectively without danger of cracking or damaging the peas and beans themselves.

As is now well known, pea and bean stalks are very tough, while the peas and beans to be threshed therefrom are easily cracked and otherwise damaged, so that with the most generally utilized type of threshing apparatus, namely, the toothed cylinder and concave, it has been found that when operated to thresh a high percentage of peas and beans, many are cracked and otherwise damaged, and as they will not then germinate, their commercial value is considerably curtailed.

Furthermore, owing to the tough and viny nature of the pea and bean stalks, it has been necessary, where a cylinder with radial teeth is used, either to build the cylinders of such diameter that the vines cannot reach sufficiently far around the cylinder to wrap and choke thereon, or to insert knives or knife-like teeth in the cylinder or concave, or in both, to cut the stalks in pieces and thus prevent wrapping and choking on the cylinder. It can be readily seen that in such threshers, a great part of the power expended goes not toward the main purpose of the machine, that is to thresh the peas or beans, but either to driving the enlarged cylinders so as to prevent the vines from wrapping and choking, or to the cutting up of the vines for the same reason, even where in many cases it would otherwise be preferred not to have the vines so cut.

The increased size of the cylinder in the first instance, obviously adds weight to the machine, requires more driving power, and increases the cost of production, as the machine of which the cylinder is a part must be proportionately larger and heavier, while if knives are used, they add materially to the cost of production as well as up-keep, as the knives must be maintained sharp at all times.

As, in a machine having a cylinder with radial teeth, the teeth move in a line around the shaft of the cylinder, the stalks are constantly jerked through, and thrown away from the cylinder, not to be struck again, or if not thrown out of reach, they will be carried on around the cylinder and choke the latter, unless some means are provided to draw the vines away.

It is, therefore, the primary object of my invention to provide a threshing apparatus which will be inexpensive both as to first cost and maintenance, and which will avoid the foregoing disadvantages.

To this end, my invention in its specific aspect, resides in the features of construction, arrangement, and operation to be now described with respect to the accompanying drawings, forming a part of this specification, and wherein:

Figure 1 is a vertical transverse section through an apparatus embodying my invention, taken substantially on line 1—1 of Fig. 2.

Fig. 2 is a vertical longitudinal section taken therethrough substantially on line 2—2 of Fig. 1.

Fig. 3 is a side view of the casing in which my improvement may be housed, illustrating a portion of the driving connections.

Fig. 4 is a detail perspective view of one of the threshing plates removed.

Fig. 5 is a similar view of the concave.

Fig. 6 is a top plan view of one of the threshing plates, and

Fig. 7 is a detail perspective view of one of the cutter supporting brackets of one of the threshing plates, removed.

Referring now to these figures, my invention relates particularly to the construction, disposition and operation of the concave 10 and threshing plates 11 which, with the means for moving and controlling the threshing plates, may be housed within a casing generally seen at 12 in Fig. 3, having as best seen in Fig. 2, an opening 13 at one side for the intake of the material to be threshed which is inclined upwardly and rearwardly to the casing 12, and having at its opposite side an upwardly and rearwardly inclined outlet 14 for the vines after the kernels have been threshed.

The concave 10 consists of a substantially flat plate which may have depending side lugs 15 providing for its connection by bolts or otherwise, in a substantially horizontal position within the lower portion of the casing 12, as clearly seen in Figs. 1 and 2, it being noted that this flat plate has upwardly inclined forward and rear portions 16 and 17 and is provided with rows of upwardly projecting teeth, the rows being spaced apart and parallel to the plane of movement of the material to be threshed as it passes over the concave, the several teeth being indicated at 18 and being tapered toward their upper free ends, as seen particularly in Fig. 5. It will also be noted that the forward edge of each of these teeth 18 inclines upwardly and rearwardly and that the rear edge is substantially vertical with a laterally projecting flange 19, the flanges 19 of alternate teeth of each row projecting in opposite directions.

The concave also has rows of openings 20 along opposite sides of the rows of teeth 18, through which the threshed kernels may drop, and is provided with up-standing lugs 21 forwardly of the several openings 20 in order to prevent the passage of vines or parts of stalks downwardly through the openings.

Each of the threshing plates 11 is substantially flat, as seen particularly in Figs. 1 and 4, and is provided with rows of teeth 22, extending in spaced parallel relation to project downwardly between the rows of teeth 18 of the concave, as clearly seen by reference to Fig. 1, it being observed, however that while the teeth 22 of the threshing plates taper downwardly toward their extremities, certain thereof may be in the form of blades 23, having sharpened edges 24 for a purpose to be presently described, the blade-like teeth 23 being interspersed throughout the series of teeth of the threshing plates and being, to permit of their ready removal, preferably connected to brackets 25 of which one plainly appears in Fig. 7, these brackets being in turn bolted or otherwise attached to the under-surfaces of the threshing plates 11.

The threshing plates 11 are also provided with upper horizontally alined bearings 26 journaled upon the cranks 27 of a horizontally disposed crank shaft 28, the latter of which may be mounted through bearings 29 of the side walls of the casing 12, the shaft ends preferably having sprocket wheels 30 by means of which the shaft may be driven from a suitable source of power through a sprocket chain 31 as seen in Fig. 3.

In operation, the threshing plates are prevented from rotation, and to this end, may have parallel up-standing and substantially rigid arms 32 between which an upper horizontally disposed rod or shaft 33 passes, this shaft being suitably secured within the casing, parallel and in the same vertical plane with, the crank shaft 28.

Thus, in operation when the crank shaft rotates, the threshing plates will be maintained at all times in substantially parallel planes with the plane of movement of the material over the concave from the intake opening 13 to the outlet opening 14 of the casing in which the thresher operates, the threshed kernels, as above stated, falling in the meantime through the concave openings 20.

In operation, as the crank shaft is revolved and the pea or bean vines having the ripe pods thereon are fed upon the concave 10, the teeth of each threshing plate on its downward and rearward movements, draw the stalks and vines rearwardly between the teeth of the concave, and shell the peas or beans from the pods and vines. The shelled peas or beans fall on the concave 10 and the agitation of the passing vines and pods shakes the shelled peas or beans through the openings 20 of the concave, while the lugs 21 prevent the ends of vines or hulls from starting through the openings. The vines and hulls are thrown to the rear by the teeth on the threshing plates, and during the rotation of the crank shaft, the arms 32 of the threshing plates move up and down with the upper shaft or rod 33 between them, thus forming guides which maintain the threshing plates with their teeth pointing downwardly at all times. As the teeth of the threshing plates always point down, as stated, they are drawn vertically out of the mass of pea or bean stalks at the end of their downward rearward movement, and thus do not tend to carry the stalks around with them as in the case of cylinders having radial teeth. In operation, the teeth of the threshing plates strike the vines and pods with sufficient force to thresh the peas or beans out with the coöperation of the teeth of the concave, and just at the time when the vines would, in the cylinder type, begin to choke by wrapping or jamming between the teeth, the teeth of the threshing plates draw vertically out of the mass of vines and pods with obviously a minimum resistance.

The teeth on the threshing plates may be made to go nearly the full length of the teeth of the concave, without fear of jamming, and the spaces between the teeth of the threshing plates and those of the concave may be narrowed until there is just sufficient space left for a hulled pea or bean to pass without danger of cracking. Very few knives need be used beneath the threshing plates, as they are only needed to cut the vines when an unduly large clump of vines is present. Furthermore, these knives or blades need not be maintained very sharp, and they dull very slowly, as when there is no jamming of the vines, the resistance thereof against the knives or blades is not sufficient to cause the vines to be cut.

It is obvious from the foregoing that my invention as thus fully described is well calculated to carry out the objects first above stated and avoid the disadvantages of machines for a like purpose now in use, and that the apparatus I propose will not only increase the percentage of threshed peas and beans, but will do so without curtailing in any way their commercial value.

I claim:

1. A threshing apparatus including a concave having up-standing teeth arranged in spaced rows extending parallel to the plane of movement of the material to be threshed, said concave having openings through which the threshed kernels may drop, threshing plates having similar rows of depending teeth arranged to extend between the rows of teeth of the concave, and including a crank shaft having cranks upon which said plates are journaled, parallel arms projecting vertically from said threshing plates, and a rod parallel with and above the crank shaft and extending between the arms of the threshing plates, for the purpose described.

2. A threshing apparatus including a concave and approximately horizontal threshing plates movable with respect to said concave, said concave and threshing plates having alternating rows of teeth projecting toward one another, and said concave having openings therein through which the threshed kernels may pass, and means adjacent the said openings to prevent the passage of vines and pods therethrough.

3. A threshing apparatus including a concave and approximately horizontal threshing plates movable with respect to said concave, said concave and threshing plates having alternating rows of teeth projecting toward one another, and said concave having openings therein through which the threshed kernels may pass, and upright lugs forwardly of the several openings to prevent the passage of vines and hulls through the openings.

4. A threshing apparatus including a concave and approximately horizontal threshing plates movable with respect to said concave, said concave and threshing plates having alternating rows of teeth projecting toward one another, and said concave having openings therein through which the threshed kernels may pass, and having its teeth provided with laterally projecting flanges along their rear upright edges adjacent the said openings.

5. A threshing apparatus including a concave and approximately horizontal threshing plates movable with respect to said concave, said concave and threshing plates having alternating rows of teeth projecting toward one another, and said threshing plates having certain of their teeth in the form of blades provided with sharpened edges, for the purpose described.

6. A threshing apparatus including a concave and approximately horizontal threshing plates movable with respect to said concave, said concave and threshing plates having alternating rows of teeth projecting toward one another, said threshing plates having substantially flat bodies provided upon their upper faces with bearings, a crank shaft for actuating the said threshing plates, having cranks on which the said bearings are journaled, and means to prevent rotation of the said threshing plates with the said cranks.

ALBERT E. REITZEL.

Copies of this patent may be obtained for five cents each, by addressing the "Commissioner of Patents, Washington, D. C."